W. A. WHITE.
FIFTH WHEEL FOR VEHICLES.
APPLICATION FILED JUNE 24, 1912.
1,046,357.
Patented Dec. 3, 1912.
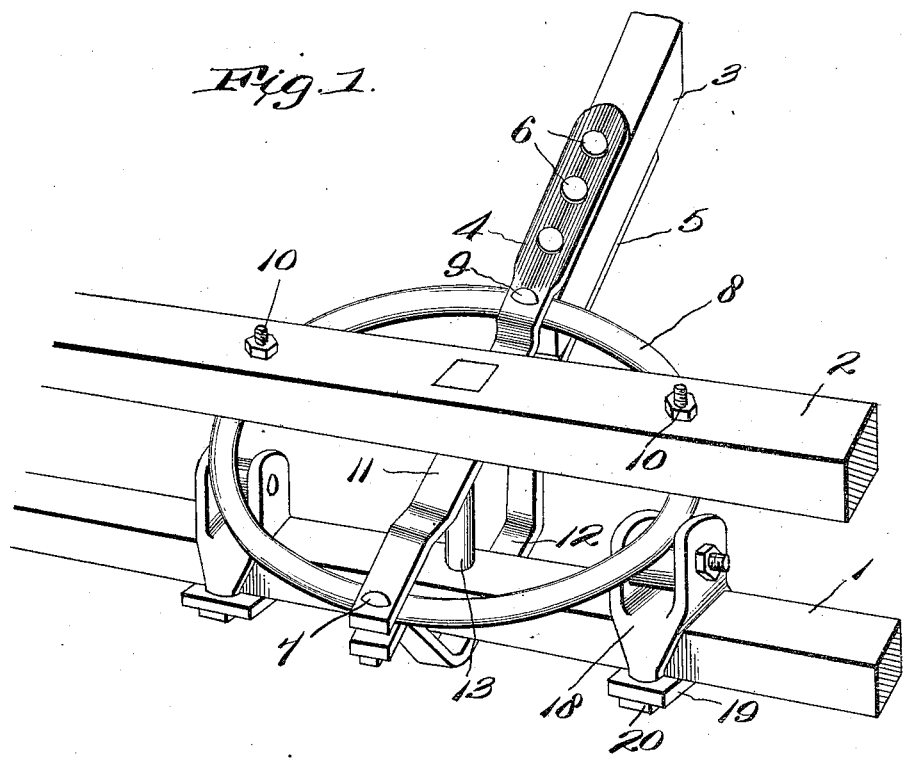
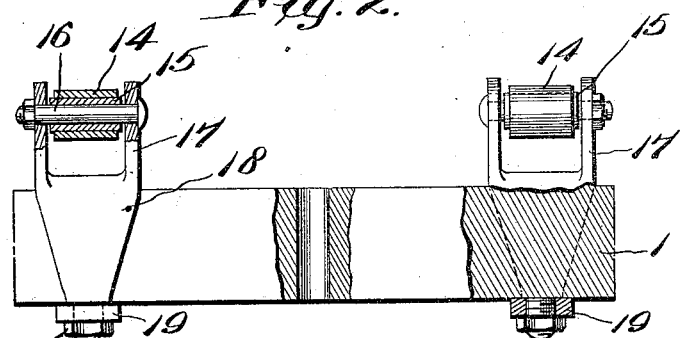
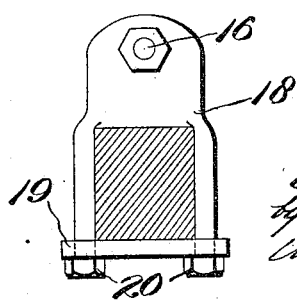
Witnesses
Edwin J. Beller
H. H. Byrne
Inventor
Walter A. White
by Wilkinson, Fisher,
Chittingford & Mackay
Attorney

UNITED STATES PATENT OFFICE.

WALTER A. WHITE, OF COVINGTON, LOUISIANA.

FIFTH-WHEEL FOR VEHICLES.

1,046,357.  Specification of Letters Patent.  Patented Dec. 3, 1912.

Application filed June 24, 1912.  Serial No. 705,656.

*To all whom it may concern:*

Be it known that I, WALTER A. WHITE, a citizen of the United States, residing at Covington, in the parish of St. Tammany and State of Louisiana, have invented certain new and useful Improvements in Fifth-Wheels for Vehicles; and I do hereby declare the following to be a full, clear, and exact description of the invention, such as will enable others skilled in the art to which it appertains to make and use the same.

The present invention relates to running gear for vehicles, more especially to the fifth wheel thereof, and has for its purpose to provide an arrangement whereby to obtain easier turning of the axle, and which will be practical in its manner of application to the vehicle.

The invention has for its further purpose to provide a device of the character in question wherein the structure will be readily capable of withstanding the wear incident to the use of the vehicle, one wherein the device is simple, and one which will be inexpensive to manufacture.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a perspective view of the construction complete; Fig. 2 is a front elevational view, partly in section, of the axle and showing the anti-friction rollers for the fifth wheel; and Fig. 3 is an end elevational view, with the axle in section, of Fig. 2.

Referring to the construction in detail, 1 designates the vehicle axle, 2 the bolster thereof, and 3 the reach pole that extends to the rear axle of the vehicle in the usual manner. A bracket, comprising a pair of bars 4 and 5, is secured to one end of the reach 3 through the medium of a plurality of bolts 6, or in any other suitable manner, and said bars are connected at their free ends by a bolt 7 that passes through the fifth wheel 8 and secures the same at its front portion. A bolt 9 secures the fifth wheel at its rear portion, or immediately adjacent the end of the reach 3, as shown in Fig. 1; and on either side, the fifth wheel is secured to the bolster 2 through the medium of bolts 10. Said bars 4 and 5 are tapered in width toward the front end, and the bar 4 has a depression or bend 11 that passes under the bolster 2; in like manner the bar 5 has a similar but greater depression 12 that passes beneath the axle 1 and is thence bent upwardly and unites with the end of the portion 4, as shown.

To the end of obtaining free and easy turning of the axle 1 on the king bolt 13, said axle is provided with a pair of anti-friction devices consisting each of a roller 14 that bears directly against the underside of the fifth wheel 8, and since said fifth wheel is constructed of round bar iron or steel, it will be readily seen that the contacting surface thereof on said rollers 14 is reduced to a minimum. Each of the rollers 14 is loosely mounted on a sleeve 15 which in turn is journaled on a bolt 16, that is secured between a pair of upstanding lugs 17 formed on the yoke 18. There is, of course, a pair of said yokes, and the same are each secured to the axle 1 through the medium of a plate 19, that is held in clamping engagement with the axle through the medium of nuts 20. It will be noted that each pair of lugs 17 projects slightly above the roller 14, and in which capacity they act after the manner of side guards which tend to limit any lateral movement of the fifth wheel, which under certain conditions might likely occur.

It is obvious that those skilled in the art may vary the details of construction and arrangement of parts without departing from the spirit of my invention, and therefore I do not wish to be limited to such features except as may be required by the claims.

What I claim is:—

1. In a construction of the character described, the combination of a vehicle axle; a bolster; a reach pole; a pair of bars secured to said reach pole at one end; a fifth wheel of round bar construction secured to said bolster, to one of said bars adjacent the reach pole, and between both of said bars at their free ends; a pair of yokes clamped on said axle; anti-friction rollers journaled on said yokes and having engagement with said fifth wheel; and a king bolt passing through the bolster, both of said bars, and the axle, substantially as described.

2. In a construction of the character described, the combination of a vehicle axle; a bolster; a reach pole; a pair of bars secured to said reach pole on opposite sides thereof, and having their opposite ends connected; a fifth wheel of round bar construction secured at two points to said bolster, to the upper of said pair of bars adjacent the reach pole, and between the connected ends of said bars; anti-friction devices for said fifth wheel comprising each a yoke clamped to said axle and having a pair of lugs, a bolt mounted on said lugs, a sleeve journaled between said lugs on said bolt, and a roller journaled on said sleeve and having frictional engagement with said fifth wheel; and a king bolt passing through the bolster, both of said bars, and the axle, substantially as described.

3. In a construction of the character described, the combination of a vehicle axle; a bolster; a reach pole; a pair of bars secured at one end of said pole on opposite sides thereof, the upper of said bars being bent to pass beneath the bolster, and the lower of said bars having a relatively greater bend and passing beneath the axle, and the free ends of said bars being secured together; a fifth wheel of round bar construction secured at two points to said bolster, to the underside of the upper bar adjacent the end of the bolster, and between the connected ends of said bars; a pair of anti-friction rollers mounted on the axle and having engagement with said fifth wheel; and a king bolt passing through the bolster, both of said bars, and the axle, substantially as described.

In testimony whereof, I affix my signature, in presence of two witnesses.

WALTER A. WHITE.

Witnesses:
A. R. SMITH,
KARL J. KOHNKE.

---

Copies of this patent may be obtained for five cents each, by addressing the "Commissioner of Patents, Washington, D. C."